United States Patent [19]
Fuller et al.

[11] 3,748,719
[45] July 31, 1973

[54] METHOD FOR FLASH REMOVAL

[75] Inventors: Francis W. Fuller; Jozef Kiwalle, both of Peoria, Ill.

[73] Assignee: Production Technology Inc., Peoria, Ill.

[22] Filed: Dec. 27, 1971

[21] Appl. No.: 212,391

[52] U.S. Cl.............. 29/481, 29/470.3, 29/557, 83/914, 90/24 A, 228/2, 228/13
[51] Int. Cl................................................ B23k 31/02
[58] Field of Search...................... 83/914; 90/24 A, 90/24 E; 29/481, 557, 470.3; 228/2, 9, 13

[56] References Cited
UNITED STATES PATENTS

| | | | |
|---|---|---|---|
| 2,945,117 | 7/1960 | Harris et al. | 83/914 X |
| 3,091,202 | 5/1963 | Mackey | 29/481 X |
| 3,096,612 | 7/1963 | Coffey | 83/914 X |
| 3,438,561 | 4/1969 | Caldon | 228/13 |

*Primary Examiner*—J. Spencer Overholser
*Assistant Examiner*—Robert J. Craig
*Attorney*—Donald C. Feix

[57] ABSTRACT

A method and apparatus for removing hot flash from a welded article including a receiving unit for accepting the welded article from a welding machine, apparatus for quickly transferring the article to a flash removal station, and a flywheel powered flash removing apparatus. The welding machine, receiving unit, transfer apparatus, and flash removing apparatus are controllably interconnected for sequential operation to provide a relatively high speed flash shearing and stripping operation.

6 Claims, 6 Drawing Figures

METHOD FOR FLASH REMOVAL

BACKGROUND OF THE INVENTION

The subject invention relates to a method and apparatus for removing hot flash from a friction welded article. More particularly, this invention defines a method and apparatus for the continuous automatic transfer of a welded article from a welding machine to flash shearing and stripping apparatus.

It is well known that friction welding affords a relatively high speed economical process for joining articles which thereafter usually require little or no final machining. There are, however, other welded assemblies which require some finished machining, including the removal of the extruded flash material from the weld joint such as on engine valves used in internal combustion engines.

The weld flash on such valves can be removed by a subsequent grinding operation. This, however, requires additional handling and tooling which is not economically feasible under good manufacturing practices.

If, on the other hand, the weld flash is removed immediately after welding, a less costly shearing operation can be used. Many types of shearing operations have been proposed. A large number of these proposals incorporate the shearing mechanism directly into the welding machine and use portions of the welding machine to assist in shearing the flash from the welded article. Such shearing procedures are not conducive to high speed, high production operations since the welding operations of the machine are delayed while the shearing operation takes place.

Other proposed methods of removing weld flash include transferring the welded assembly from the welding machine and initiating the shearing operation at some remote location. This procedure requires, however, that the transfer of the article from the machine and the shearing of the flash from the article occur within a very short time after welding to prevent hardening of the flash. If the shearing operation is delayed, the flash will harden beyond the shearing capabilities of most shearing apparatus. It is especially important therefore that transfer of a welded article from the machine to a shearing apparatus be accomplished in an extremely short period of time.

SUMMARY AND OBJECTS OF THE INVENTION

Accordingly, it is an object of the present invention to construct a flash shearing apparatus for removal of hot flash from a welded article which is extremely fast and efficient.

Another object of the present invention is to transfer the welded assembly from the welding machine to the shearing apparatus in an extremely short period of time.

Another object of the present invention is to operate the shearing apparatus in a continuous automatic cycle.

Other objects and advantages of the present invention will become more readily apparent upon reference to the accompanying drawings and following description.

DESCRIPTION OF THE PREFERRED EMBODIMENTS

Figure 1:
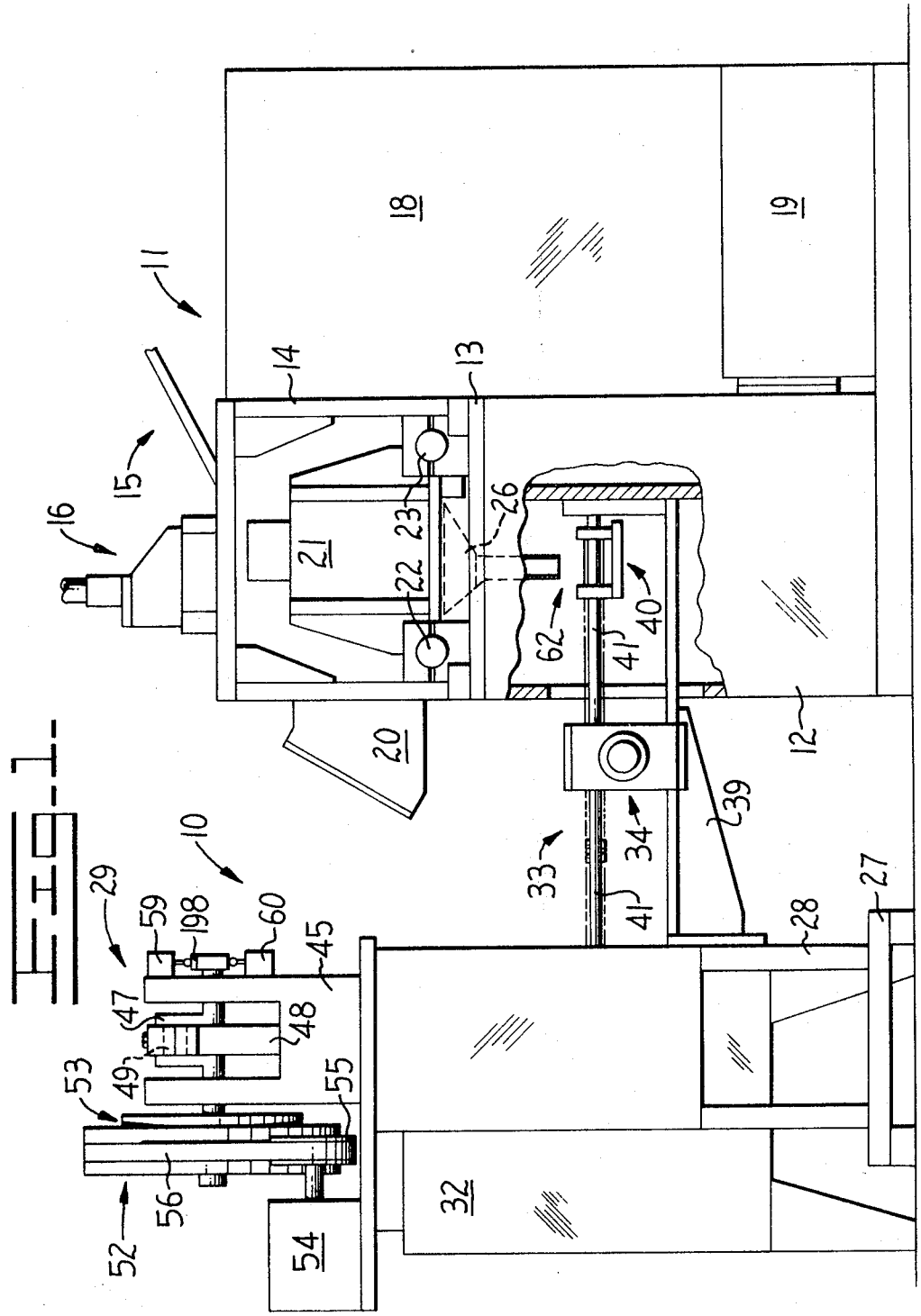
FIG. 1 is a side elevation of a friction welding machine and a flash shearing unit constructed in accordance with the present invention with portions broken away for illustrative convenience.

FIG. 1 illustrates a flash shearing unit 10 operatively coupled to and in close association with a friction welding machine 11. Although other types of joining machines and processes could be utilized with the flash shearing unit, a friction welding machine is illustrated for descriptive purposes.

A rear view of the friction welding machine 11 is shown in FIG. 1 and therefore only certain portions of the machine are visible. These portions include a machine base 12, a table plate 13, and a framework 14, for supporting the automatic loading equipment designated generally by reference numerals 15 and 16. Other portions of the friction welding machine which are also shown include an electrical power source 18, an electric motor 19 for rotating the spindle, a machine function control panel 20, and a tailstock fixture 21. The tailstock fixture 21 is supported on the machine by a pair of tie-bars 22 and 23.

A weld specimen receiving and conveying chute 26 is situated within the table plate 13 of the friction welding machine 11. The conveying chute accepts a completed weld specimen when it is released by the tailstock fixture 21.

Portions of the flash shearing unit 10 which are illustrated in FIG. 1 include a support base 27, a framework 28 for supporting and housing various components of the shear unit, and a flash shearing energy source 29. The flash shearing unit also includes an electrical control panel 32 for housing the various switching and control assemblies for the shear unit, a weld specimen transfer assembly 33, and a weld specimen reject assembly 34.

Figure 2:
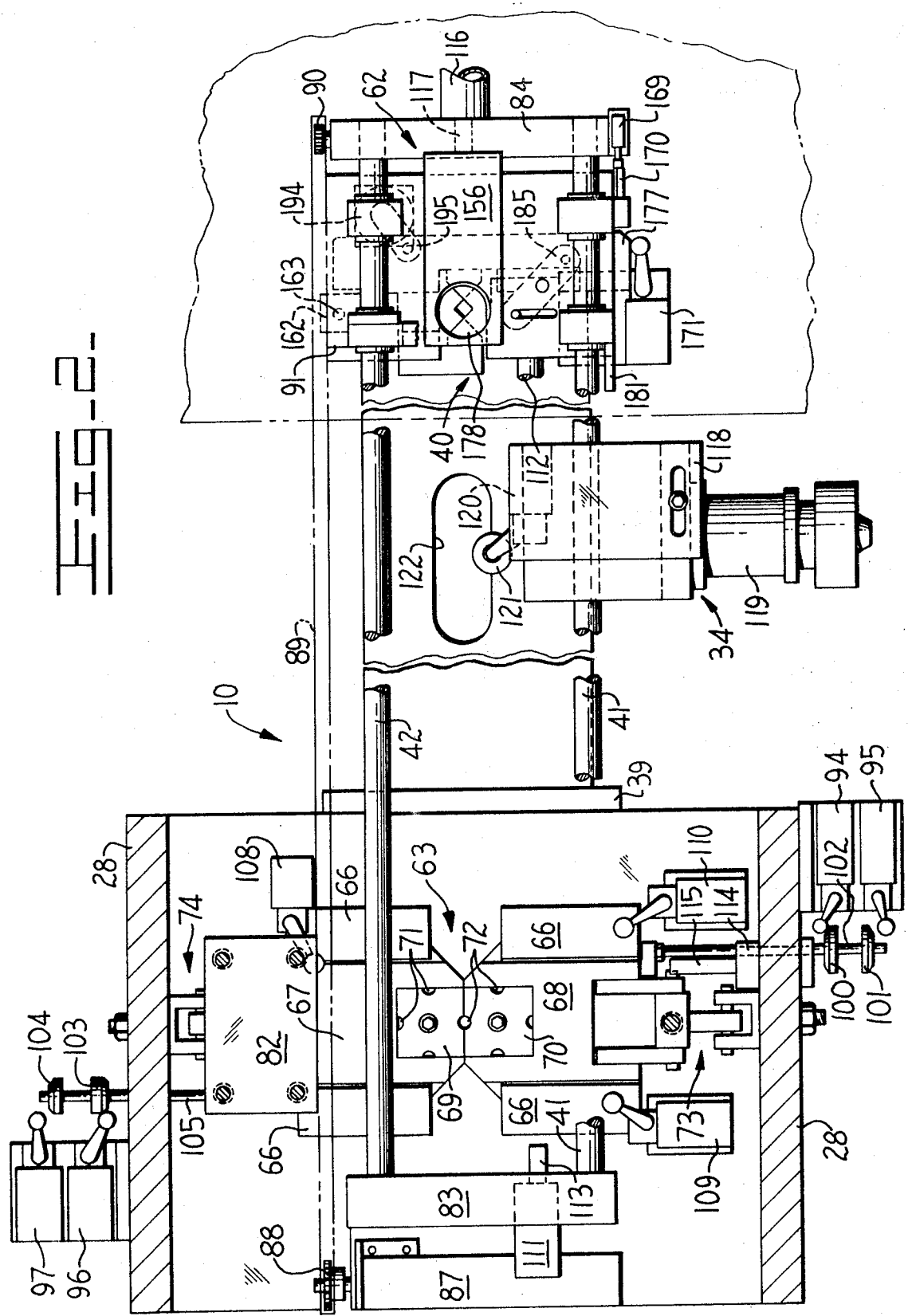
FIG. 2 is a plan view partially in section of the shear unit of the present invention.

The weld specimen transfer assembly 33 includes a support unit 39, a weld specimen carrier unit 40, and two parallel support rods 41 and 42 which form a controlled track for the carrier unit, as best shown in FIG. 2.

With particular reference to FIG. 1, the flash shearing energy source 29 includes a support frame 45 mounted on a top plate 46 of the flash shearing unit 10, a crankshaft 47 supported for rotation within the frame 45, and a connecting rod 48 which is fastened at one end to the journaled area 49 of the crankshaft. A flywheel unit 52, including a clutch and brake assembly 53, is operationally associated with one end of the crankshaft 47. A motor 54 is arranged to continually drive the flywheel 52 by means of a pulley 55 and belt 56. The entire energy source 29 may be purchased as a half-press from any one of several suitable commercial sources. Two limit switches 59 and 60 are mounted on the support frame 45 with the switching arms of each limit switch in contact with the shaft 47. The exact purpose of the limit switches will be explained at a later point in the description.

Greater details of the flash shearing unit 10 can be seen with particular reference to FIGS. 2 through 6 of the drawings. A base plate 61 is fixed within the framework 28 and supports a number of elements of the shearing unit. As best shown in FIG. 2, the flash shearing unit includes a weld specimen receiving station 62, and a flash removal station 63 with the carrier unit 40 used to transfer a weld specimen from the receiving station to the flash removal station.

The flash shearing station 63 includes a plurality of guide blocks 66 fastened to the base plate 61 and used to guide the movement of two moveable shear members 67 and 68. An interchangeable shear die 69 is attached to shear member 67 and a similar interchangeable shear die 70 is attached to shear member 68.

Shear die 69 contains eight separate semi-circular shear surfaces 71, one every 90° on the top and bottom surfaces of the die. Each semi-circular shear surface 71 matches with a similar semi-circular shear surface 72 on shear die 70 to form the total shear surface for holding the welded specimen. In this way, each set of shear dies provides eight separate shear surfaces by rotating the dies or by turning the dies over.

Figure 3:
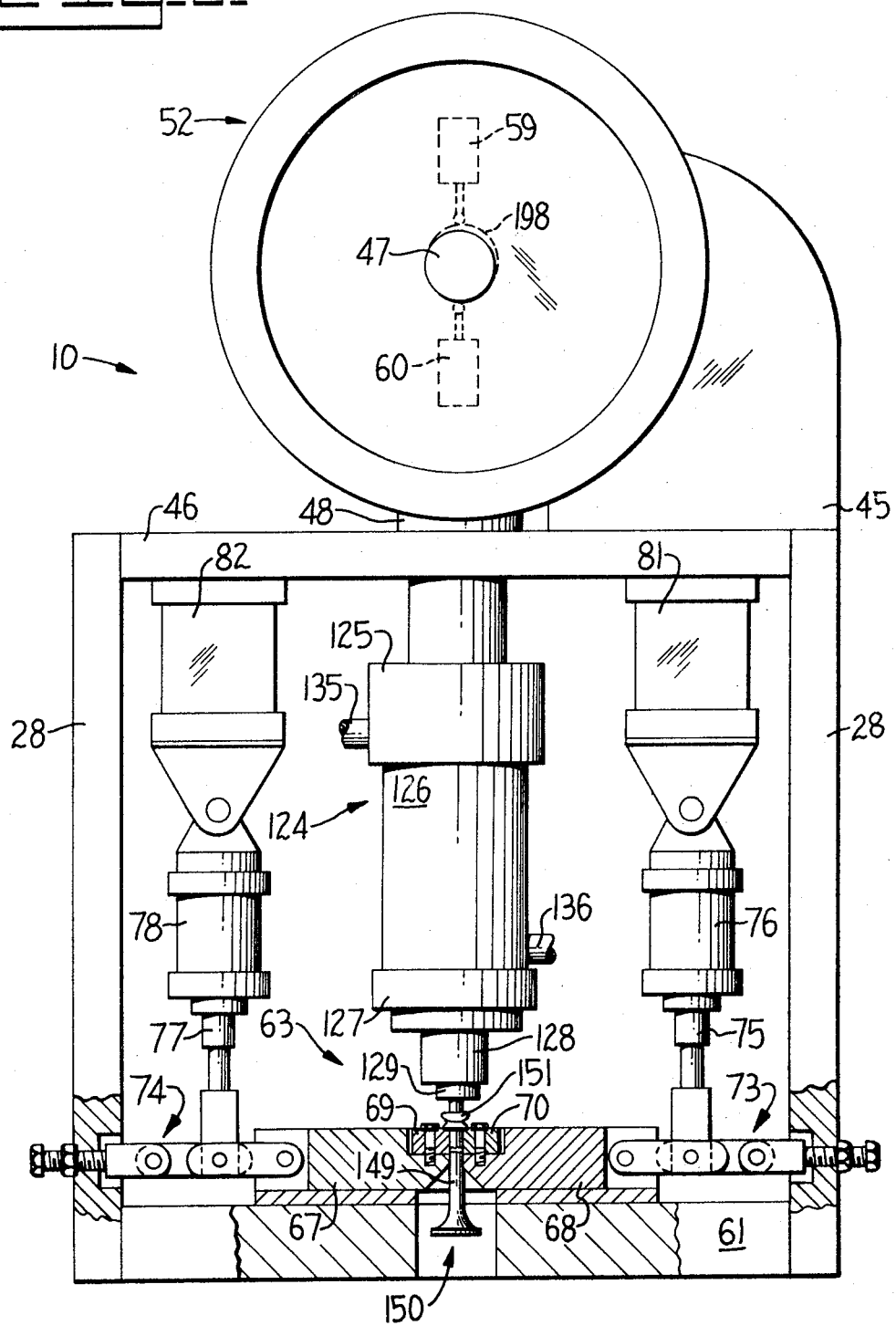
FIG. 3 is a side elevation view partially in section of a portion of the shear unit.

A knee-type toggle link assembly 73 fastens moveable shear member 68 to the framework 28 and a similar knee-type toggle link assembly 74 fastens moveable shear member 67 to the opposite side of the framework 28. As best shown in FIG. 3, a piston rod 75 of a fluid cylinder 76 is pivotally connected to the knee-type assembly 73. On the opposite side of the shear assembly 10, a piston rod 77 of a fluid cylinder 78 is pivotally connected to the knee assembly 74. Fluid cylinder 76 is upheld by a support assembly 81 fastened to the top plate 46. In a like manner, fluid cylinder 78 is upheld by a support assembly 82 also fastened to top plate 46. In FIG. 2, portions of the fluid cylinder 76 and support assembly 81 have been removed to show greater details of the knee-type assembly 73.

A vertical plate member 83 is secured to the base plate 61 and supports one end of each of the parallel support rods 41 and 42. The opposite ends of the rods are supported within a second vertical plate member 84 which is a portion of the support unit 39. It is evident that the two parallel support rods extend from the weld specimen receiving station 62 to the flash removal station 63. In this way, the carrier unit 40 can travel on the rods from one station to the other.

A rotary motor 87 is drivingly connected to a sprocket 88 and is supported on the base plate 61. The sprocket engages an endless chain 89 which extends from the flash removal station 63 to the weld specimen receiving station 62 where it engages an idler sprocket 90 which is fastened to plate 84.

Figure 6:
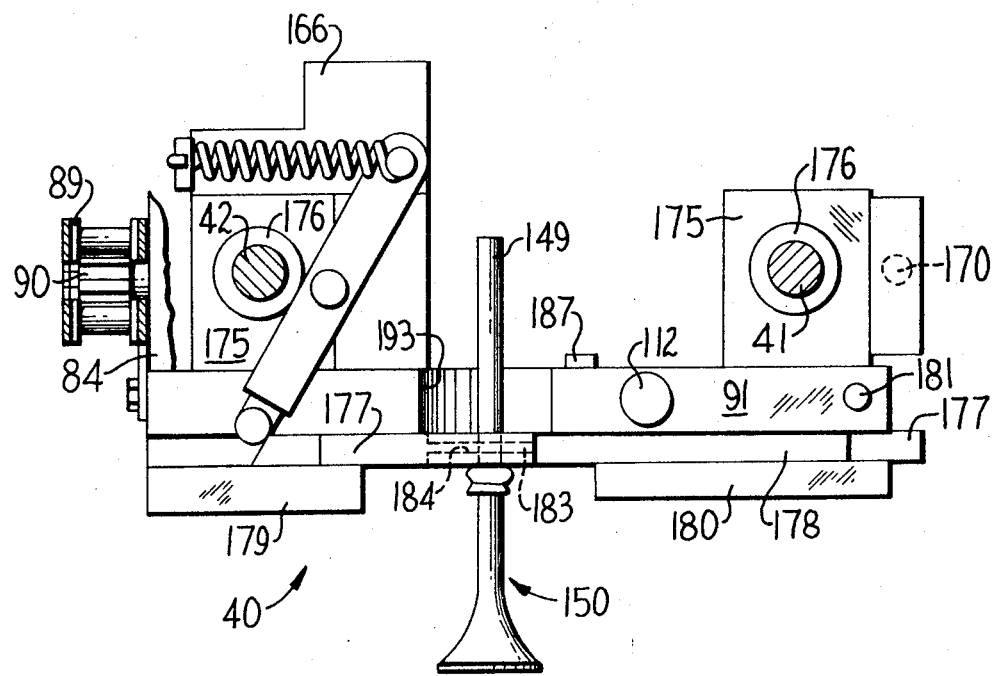
FIG. 6 is a front elevation view partially in section of the article transfer carrier.

The endless chain 89 is fastened to a base plate member 91 of the carrier unit 40. Therefore, as the endless chain moves in either direction, the carrier unit 40 will move in the same direction. The connection between the chain 89 and the carrier unit 40 is best seen in FIG. 6.

A plurality of limit switches are associated with the flash removal station 63 and are used to control various functions of the shearing unit during automatic cycling of the unit. Two of these limit switches 94 and 95 are secured to the outer surface of framework 28 and two similar switches 96 and 97 are secured to the outer surface of the opposite side of framework 28. Switches 94 and 95 are activated by a pair of tripping members 100 and 101 carried on a rod 102 which is secured to the moveable shear member 68. In a similar manner, switches 96 and 97 are activated by a pair of tripping members 103 and 104 respectively which are carried on a rod 105 secured to the moveable shear member 67.

Other limit switches associated with the flash removal station 63 and used to control various functions within the automatic shearing cycle include switches 108, 109 and 110. These three limit switches are activated by various portions of the carrier unit 40 as will be described at a later point in the description.

A fluid cylinder 111 is mounted within the vertical plate member 83 and serves to absorb the shock of the carrier unit 40 as it is rapidly moved into position within the flash removal station 63. A forwardly extending rod 112 mounted within base plate member 91 of the carrier unit 40 contacts a piston rod 113 of cylinder 111 as the carrier unit 40 approaches the end of travel within the flash removal station. A similar fluid cylinder 116 is mounted within plate 84 of the weld specimen receiving station 62. A piston rod 117 of the fluid cylinder contacts the rearward end of base plate member 91 of the carrier unit 40 as the carrier unit rapidly moves into position within the weld specimen receiving station 62. Fluid cylinders 111 and 116 are connected by a closed loop system wherein fluid expelled from one cylinder is forced into the other. Therefore, as one piston rod such as 113 moves into cylinder 111, piston rods 117 will be moved out of cylinder 116.

The weld specimen reject assembly 34 includes a frame 118 secured to the support unit 39 and a fluid cylinder 119 carried on the frame 118. The reject assembly also includes a limit switch 120 supporting a tripping arm 121. Limit switch 120 is used to activate cylinder 119 upon being tripped by a weld specimen improperly oriented within the carrier unit 40 of the transfer assembly 33.

Figure 4:
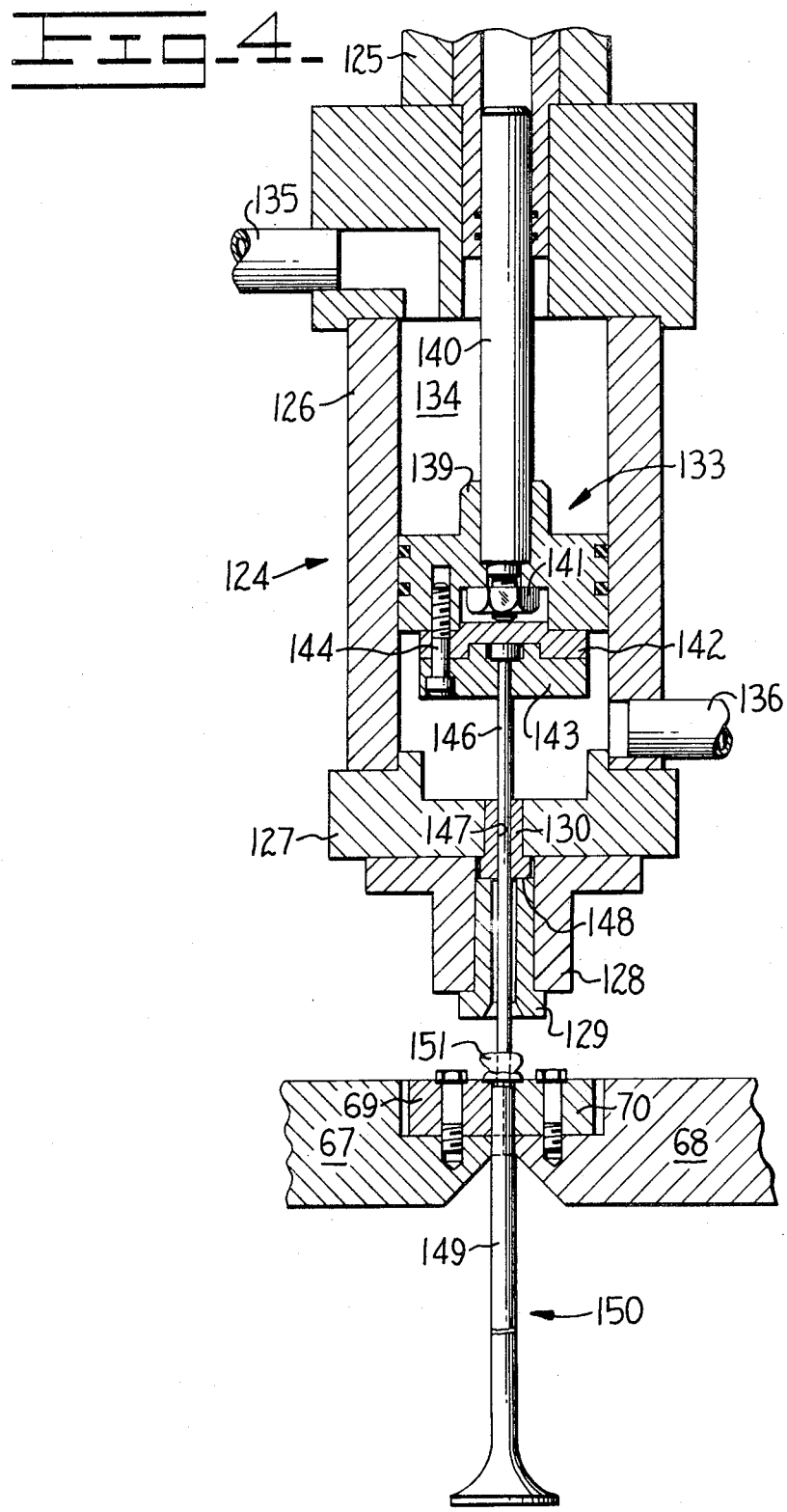
FIG. 4 is an enlarged sectional view of a portion of the shearing unit including the flash shearing mechanism and the flash stripping apparatus.

A shearing and ejecting assembly 124 is fastened to the connecting rod 48 of the flash shearing energy source 29. As best shown in FIGS. 3 and 4, the shearing and ejecting assembly is situated in the center of the flash removal station 63 and except during a flash removing operation, is in an upward position.

The shearing and ejecting assembly 124 includes a top ring member 125, a cylinder 126, and a lower ring member 127. Secured to the lower ring member is a hollow support tube 128 which contains a hollow guide member 129. A stop pin 130 is held in place between the lower ring member 127 and the hollow guide member 129.

A piston assembly 133 is situated in cylinder 126 and is moved up or down in response to fluid pressure which is introduced into the cylinder chamber 134 through a pipe 135 or 136.

The piston assembly 133 includes a piston 139, a piston rod 140 which is fastened to the piston by a nut 141, a stop plate 142, and a retainer plate 143. Plates 142 and 143 are secured to the piston 139 by a plurality of cap screws, one of which is shown at 144. An ejector pin 146 is securely fastened between stop plate 142 and retainer plate 143 such that the pin moves up or down within the cylinder chamber 134 as the piston assembly 133 is raised or lowered within the cylinder. The ejector pin is guided by a bore 147 in the stop pin 130. A lower surface 148 of stop pin 130 contacts a stem portion 149 of a welded valve specimen 150 during the shearing operation.

Figure 5:
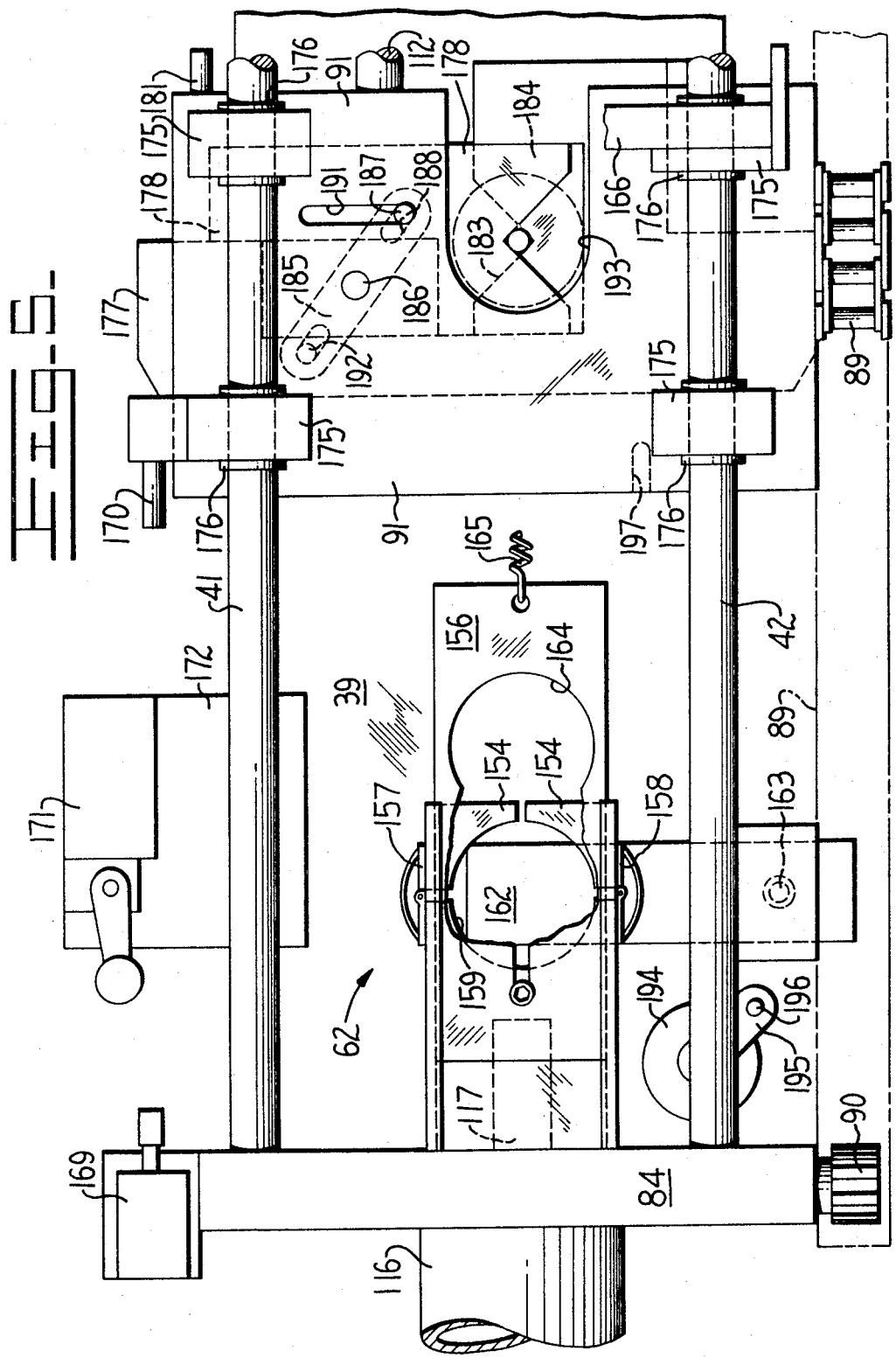
FIG. 5 is a plan view of a portion of the flash shearing unit including an article receiving station and a transfer assembly.

The weld specimen receiving station 62, as best illustrated in FIG. 5, includes a weld specimen guide block 153, two hinged closure doors 154 and 155 and a top cover plate 156. Door 154 is secured to the side of the guide block by a spring loaded hinge 157 and door 155 is secured to the opposite side of the guide block by a spring loaded hinge 158. The guide block and closure doors fit together to form a cylindrical opening 159 which guides a completed weld assembly into position within the receiving station. A spring loaded plate 162 is situated at the bottom of hole 159 and activates a switch 163 when a weld specimen falls into position on top of the spring loaded plate.

With the top cover plate 156 in the position shown in FIG. 5, the hole 159 is covered by the plate and a weld specimen received from the welding machine will rest on the cover plate immediately above the hole 159.

The cover plate 156 contains a hole 164 which corresponds generally to the hole 159 formed by the guide block 153 and closure doors 154 and 155. When the cover plate is moved to the left, as viewed in FIG. 5, hole 164 registers with hole 159. The cover plate is normally held in the position shown by a spring 165 which fastens to a guard (not shown) over the endless chain 89. Movement of the cover plate to the left is accomplished by engagement of the cover plate with a bar 166 fastened to the carrier assembly 40.

A limit switch 169 is secured to the plate member 84 and is activated by a horizontally extending bar 170 which is mounted on the carrier unit 40. Switch 169 serves to stop the motor 87 which drives the endless chain 89. A limit switch 171 is mounted on a plate 172 and serves to signal when the carrier unit 40 is in a loaded position and also starts the transfer motor 87.

The carrier unit 40 for transferring the welded assembly from the receiving station 62 to the shearing station 63 is best shown in FIGS. 5 and 6. The carrier unit includes a base plate member 91 and a plurality of bearing block assemblies 175 which are fastened to the top of the base plate. Each bearing block contains a ball bushing unit 176 which allows the carrier relatively frictionless movement along the bars 41 and 42. A pair of clamping jaws 177 and 178 are held between base plate member 91 and a pair of spaced retaining plates 179 and 180. Clamping jaws 177 and 178 reciprocate within the carrier unit 40 for clamping and releasing of a weld specimen. The clamping portion 183 of jaw 177 slides into a grooved portion 184 of jaw 178.

A link member 185 is pivotally connected by a pin 186 within a recess of the base plate 91. A rod 187 is fastened to jaw member 178 and extends through a hole 188 in the link. A slot 191 in the base plate 91 allows pin 187 to move relative to the plate when the link 185 is pivoted on pin 186. Another pin 192 secures jaw 178 to the opposite end of link 185. In this manner when link 185 is rotated about pin 186, jaw member 177 moves in one direction and jaw member 178 moves in the opposite direction. Due to the interconnection of the two jaws with the link member, a force applied to one jaw member causes concurrent movement of the other jaw member.

A slot 193 in the base plate 91 of the carrier unit 40 coincides with hole 159 of the receiving station 62 when the carrier unit is in position beneath the receiving station. In this manner, a weld specimen gravitating through hole 159 in the receiving station will pass through the carrier unit 40 if jaws 177 and 178 are in an open position.

A rotary actuator 194 is secured to support unit 39 and contains a lever arm 195 which carries a pin 196. When the carrier unit 40 is moved beneath the receiving station 62, pin 196 engages a slot 197 in jaw 177 if the jaws 177 and 178 are in an open position. Therefore, when the rotary actuator 194 is activated, the lever arm 195 and pin 196 are effective to close the jaws 177 and 178.

OPERATION

While the operation of the present invention is believed clearly apparent from the foregoing description, further amplification will subsequently be made in the following brief summary of such operation.

A flash shearing operation begins with the carrier unit 40 in proper position beneath the receiving station 62. As a welding operation is completed by the welding machine 11, the completed specimen 150 is released by the tailstock assembly 21 and is permitted to fall with its heavier head end downwardly disposed into the specimen receiving and conveying chute 26.

The welded valve specimen 150 falls from the chute 26 into the receiving station, where it passes through the guide block 153 by way of the hole 164 in the top cover plate 156 which is aligned with hole 159 in the block. The head of the valve will come to rest on the spring loaded plate 162 and cause the opposite end of plate 162 to raise and activate switch 163. Activation of switch 163 energizes a relay in the control circuit which activates the rotary actuator 194. Since pin 196 is in position within slot 197 of clamping jaw 177, as arm 195 rotates, jaw 177 is moved to the closed position. Since jaws 177 and 178 are interconnected by means of the link 185, closing of jaw 177 causes simultaneous closing of jaw 178 and the welded specimen, or valve 150, is clamped between the closed jaws.

As the jaws 177 and 178 close, limit switch 171 is activated by jaw 177 which energizes a solenoid in the control circuit and starts the rotary motor 87. The motor drives the chain 89 which in turn brings the carrier 40 forward toward the flash removal station 63.

As the chain 89 brings the carrier 40 into position within the flash removal station 63, a forwardly extending rod 181 secured to the forward end of base plate member 91 contacts the limit switch 109. Activation of the limit switch breaks a contact in the motor control circuit and stops the motor 87. At the same time, the forwardly extending rod 112 fastened to the carrier base plate 91, contacts the fluid piston rod 113 of cylinder 111. The piston rod is forced into the cylinder which forces fluid out of the cylinder and into cylinder 116 situated in the weld receiving station 62. This forces piston rod 117 out of cylinder 116 which conditions it to absorb the shock of the carrier 40 when it returns to the weld specimen receiving station. The piston rod 113 and cylinder 111 therefore absorbs the shock of the carrier as it moves into position within the flash removal station.

Activation of limit switch 109 also energizes a relay in the control circuit which opens a valve feeding the head end of fluid cylinders 76 and 78. Piston rods 75 and 77 are therefore extended and the knee-type toggle link assemblies 73 and 74 are flexed open and the moveable shear members 67 and 68 are moved forward toward the welded valve specimen or assembly 150. The interchangeable shear dies 69 and 70 contact the stem 149 of the valve assembly immediately below an annular weld flash collar 151. As the shear block 67 and 68 move inward toward the valve assembly, tripping members 100 and 103 contact limit switches 94 and 96 respectively. These limit switches energize a solenoid in the control circuit which opens a valve and supplies fluid to the head end of cylinder 114. Piston rod 115 is extended and contacts clamping jaw 177 forcing the jaw open. Opening of jaw 177 also opens jaw 178 due to the interconnection by means of link 185.

As jaw 178 opens, it contacts limit switch 108. This limit switch completes a circuit in the control system which activates the motor 87 in a reverse direction and drives the chain 89 away from the flash removal station 63. As previously described, the carrier unit 40 is fastened to the chain 89 and will move away from the flash removal station toward the weld specimen receiving station 62. As the carrier unit moves away from the flash removal station, limit switch 110 is released which indicates that the carrier unit is out of position and the shearing operation can begin. Limit switch 110 therefore completes a circuit in the control system which activates the clutch assembly 53. The clutch picks up the rotating flywheel 52 which forces crankshaft 47 and connecting rod 48 downward. Since the shearing and ejecting assembly 124 is fastened to the connecting rod 48, it moves downward and the valve stem 149 enters the hollow guide member 129. The valve stem continues to move into the hollow guide member until it contacts the surface 148 of stop pin 130. Further downward movement of the assembly 124 forces the valve assembly 150 downward through the shear dies 69 and 70 and the flash collar 151 is sheared from the valve assembly.

When the crankshaft 47 reaches its extreme downward position, limit switch 59 is activated by a cam member 198 carried on the shaft 47. This limit switch opens a contact in the control circuit and releases the clutch and activates the brake of the assembly 53. The brake serves to stop assembly 124 in the downward position. At the same time, a timer is energized in the control circuit which allows the shearing assembly 124 to remain in the downward position for a controlled length of time. This time period is utilized to allow the ejector pin 146 to eject the sheared valve assembly 150 out of the die members 69 and 70.

Activation of limit switch 59 also energizes a solenoid which opens a valve supplying fluid to pipe 135. The fluid enters the head end of chamber 134 and forces the piston assembly 133 downward. As the piston assembly moves downward, the ejector pin 146 secured within the piston assembly moves downward and the forwardly extending end of the ejector pin contacts the valve stem 149. Further downward movement of the piston assembly within the chamber 134 forces the sheared valve 150 downward and out of the clamping confines of the die members 69 and 70.

As the valve ejecting operation is completed, the timer previously mentioned times out and a contact in the control circuit is completed. This energizes a solenoid and shifts a valve controlling flow of fluid cylinders 76 and 78. Fluid is then supplied to the rod end of cylinders 76 and 78 and the piston rods 75 and 77 are drawn into the cylinders. This, of course, causes the knee-type toggle link assemblies 73 and 74 to open. The shear members 67 and 68 and shear dies 69 and 70 are therefore pulled backward to an open position. As the shear members 67 and 68 are moved apart, tripping members 101 and 104 contact limit switches 95 and 97 respectively.

Limit switches 95 and 97 energize a solenoid which positions a valve to supply fluid to the rod end of cylinder 126 through pipe members 136. This moves the piston assembly 133 upward in the chamber 134 and draws the ejector pin 146 upward into the chamber 134 also.

At the same time, a contact is made in the control circuit which energizes the clutch in assembly 53 which picks up the rotating flywheel 52. The crankshaft 47, connecting rod 48 and shearing assembly 124 are all raised to the upward position. In the upward position, cam 198 depresses a limit switch 60 which breaks a contact in the control circuit. This releases the clutch and activates the brake in assembly 53 stopping the crankshaft 47 and connecting rod 48 in the upward position.

During the shearing and ejecting operations, the carrier unit 40 has returned to a position within the receiving station 62. As the carrier unit returns, plate 91 contacts the piston rod 117 forcing it into the cylinder 116. This absorbs the shock of the returning carrier by forcing fluid out of cylinder 116 and into cylinder 111 at the flash removal station. At the same time, the horizontally extending rod 170 contacts limit switch 169. This breaks a contact in the control circuit and stops the motor 87 which is driving the chain 89 and carrier 40.

As the carrier 40 moves back into position under the valve receiving station, bar 166 contacts the top cover plate 156 and slides it back so that hole 164 registers with hole 159. Since the friction welding machine is an automatic cycle, a welded valve assembly has been completed and previously released into the conveying chute 26. The completed valve assembly is therefore resting on cover plate 156 as it is moved backward by the carrier unit.

As hole 164 in the cover plate 156 aligns with hole 159, the welded valve assembly will fall through and come to rest on spring loaded plate 162. Under the weight of the valve, the plate raises and contacts switch 163 closing the previously opened clamping jaws 177 and 178. This then is the beginning of another automatic shearing cycle and the cycle continues as previously described.

In the event that a welded valve assembly should enter the receiving station in a position inverted from that described, the automatic cycle will continue and the carrier will be driven forward as before. However, as the carrier 40 passes the weld specimen reject station 34, the head of the valve, which is now extended upwardly, contacts the tripping arm 121 of limit switch 120. This switch breaks a contact in the control circuit to stop the motor 87. The carrier is now stopped above the reject hole 122 in support unit 39. Limit switch 120 will also close a contact which energizes a timer and a solenoid in the control circuit. The solenoid opens a valve which supplies fluid to the head of cylinder 119 and thereby extends the piston rod. The piston rod of cylinder 119 contacts jaw 177 and opens the carrier jaws. The valve is then released and falls into the open reject hole 122. As the timer times out, a solenoid is energized which conditions a valve to supply fluid to the rod end of fluid cylinder 119 and returns the piston rod within the cylinder. At the same time, a contact in the control circuit is completed which energizes motor 87 in a reverse direction and drives the carrier unit 40 to the receiving station 62. If a completed valve assembly has been provided by the welding machine, the automatic cycle continues as before. However, if the machine has not yet completed a welded valve assembly, the automatic cycle will pause momentarily while the machine completes an assembly and supplies it to the weld specimen receiving station. Once the specimen falls into position on plate 162, the automatic cycle begins as before.

In view of the foregoing, it is readily apparent that the structure of the present invention provides an improved method and apparatus for removing the flash from a welded assembly. While the invention has been described and shown with particular reference to the preferred embodiment, it will be apparent that variations might be possible that would fall within the scope of the present invention which is not intended to be limited, except as defined in the following claims.

What is claimed is:

1. A method of removing flash from an article joined in a welding machine whereby the flash is produced by displacing material from a common interface of two weld members due to heat and pressure at the interface including the steps of, receiving an article discharged from the welding machine at a receiving station, transferring said article from the receiving station into a carrier unit, moving the carrier unit from the receiving station to a flash removal station, depositing said article into a flash removal apparatus, and activating the flash removal apparatus to remove the flash from said article.

2. The method as defined in claim 1 including a further step of ejecting the article from the flash removal apparatus.

3. The method as defined in claim 2 including a further step of returning said carrier unit to said receiving station.

4. The method as defined in claim 1 including a further step of sensing orientation of the article in the carrier unit and ejecting said article from the carrier unit if the article is improperly oriented for introduction to the flash removal apparatus.

5. The method of claim 4 whereby the article is ejected from the carrier unit in response to a signal generated by a sensing mechanism due to the presence of an improperly oriented article.

6. The method as defined in claim 5 wherein the signal from the sensing means activates a fluid motor for removing the improperly oriented article from the carrier unit.

* * * * *